(12) United States Patent
Awada

(10) Patent No.: US 11,946,839 B1
(45) Date of Patent: Apr. 2, 2024

(54) METHOD OF CLEANING OF ADSORBED MOLECULES IN DRYING STATE ON METAL OXIDE BY UV-VISIBLE ASSISTED PHOTOCATALYSIS

(71) Applicant: KING FAISAL UNIVERSITY, Al-Ahsa (SA)

(72) Inventor: Chawki Awada, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/242,144

(22) Filed: Sep. 5, 2023

(51) Int. Cl.
| | |
|---|---|
| *B08B 7/00* | (2006.01) |
| *B08B 7/04* | (2006.01) |
| *G01N 1/34* | (2006.01) |
| *G01N 21/65* | (2006.01) |

(52) U.S. Cl.
CPC ............. *G01N 1/34* (2013.01); *B08B 7/0057* (2013.01); *G01N 21/658* (2013.01)

(58) Field of Classification Search
None
See application file for complete search history.

(56) References Cited

U.S. PATENT DOCUMENTS 4,003,880 A * 1/1977 Sidebotham ............ B29B 17/02
528/495

OTHER PUBLICATIONS

Sandua, et al., "An Alternative Methodology for the Evaluation of Photocatalytic Activity of Polymeric Coatings by Monitoring Dye Degradation", Coatings 2022, 12, 1529, pp. 1-16, First available online Oct. 12, 2022.
Almulhem, et al., "Synergistic Effect of the KBrO3 Electron Acceptor on the Photocatalytic Performance of the Nb—TiO2 Nanocomposite for Polluted Phenol Red Wastewater Treatment", Crystals 2022, 22, 1758, pp. 1-11, First available online Dec. 4, 2022.
Almulhem, et al., "Photocatalytic Degradation of Phenol Red in Water on Nb(x)/TiO2 Nanocomposites", Crystals 2022, 12, 911, pp. 1-13, First available online Jun. 26, 2022.
Almulhem, et al., "Study of Phenol Red Photocatalytic Decomposition on KBrO3-Supported TiO2 Nanoparticles for Wastewater Treatment" Separations 2023, 10, 162, pp. 1-15, First available online Feb. 27, 2023.

* cited by examiner

*Primary Examiner* — Paul S Hyun
(74) *Attorney, Agent, or Firm* — Nath, Goldberg & Meyer; Richard C. Litman

(57) ABSTRACT

Methods for cleaning dye molecules on a surface of a metal/metal oxide nanocomposite substrate by irradiating the substrate with UV-visible light. The cleaning of the adsorbed dye molecules is confirmed using an ultrasensitive optical method.

13 Claims, 1 Drawing Sheet

METHOD OF CLEANING OF ADSORBED MOLECULES IN DRYING STATE ON METAL OXIDE BY UV-VISIBLE ASSISTED PHOTOCATALYSIS

BACKGROUND

1. Field

The present disclosure relates to methods of cleaning adsorbed molecules on a metal oxide through photocatalysis.

2. Description of the Related Art

The photocatalytic activity of particles and fibers can be easily monitored by dissolving them in an aqueous solution of methylene blue. In the case of coatings, however, the contact area between the coating and dye solution is relatively smaller than in a suspension of particles or fibers and, thus, the degradation time of the overall dye in the solution is very long and can lead to a number of practical problems such as solvent evaporation, changes in concentration, or inhomogeneities in the system.

Photocatalysis is considered an eco-friendly method, and no sludge is produced in the colorant removal process. One of the most widely known compounds employed in this specific photochemical method is titanium dioxide ($TiO_2$). When this metal oxide precursor is illuminated under UV light (around 380 nm), an electron is excited to the conduction band, leaving a hole in the valence band of the $TiO_2$. This phenomenon chemically produces hydroxyl radicals which act as oxidating agents to transform organic matter (i.e., dyes) to non-toxic species such as $CO_2$ and $H_2O$. Then, the presence of sulphur heteroatoms in dyes are transformed to ($SO_4^{2-}$), and nitrogen mineralization is conducted. Amino groups are released by means of an oxidative process, creating $NH^{4+}$. Afterwards, $NO^{3-}$ ions are produced.

One of the parameters which directly affects the degradation rate of a dye using $TiO_2$-based photocatalysis is the dopant content effect. In this sense, by combining $TiO_2$ with other semiconductor oxides, the resultant photocatalysis efficiency is enhanced by narrowing the band gap of $TiO_2$. This fact is due to the $Fe^{3+}$ separation capacity of photogenerated electron-hole pairs.

$Fe_2O_3$ is a perfect candidate in surface catalysts due to its abundance, stability and matched band position with $TiO_2$ for efficient charge separation. Moreover, these two types of metal oxide precursors interact with light in a different way for photocatalytic applications since $TiO_2$ has its maximum peak of absorbance in a wavelength (388 nm), whereas $Fe_2O_3$ has its maximum peak in the visible spectrum (620 nm), respectively. Furthermore, there is much recent research addressing that the incorporation of $Fe_2O_3$ particles to the coating has influence in $TiO_2$ particle size and photocurrent responses under a UV light source irradiation. The latest articles about enhancing photocatalytic activity employ this couple of metal oxide so as to eliminate organic pollutants since it presents an effective low cost method.

Thus, new methods of cleaning adsorbed molecules on a metal oxide solving the aforementioned problems are desired.

SUMMARY

In an embodiment, the present subject matter relates to a method of cleaning adsorbed dye molecules on a metal/metal oxide nanocomposite substrate, the method comprising:

step 1: detecting for a positive presence of the adsorbed dye molecules on a surface area of the substrate by using an ultrasensitive optical method;

step 2: irradiating the surface area of the substrate with UV-visible light to clean the adsorbed dye molecules; and step 3: detecting for a negative presence of the adsorbed dye molecules on the surface area of the substrate by using the ultrasensitive optical method.

In a further embodiment, the present subject matter relates to a method of cleaning adsorbed dye molecules on a metal/metal oxide nanocomposite substrate, the method further comprising:

step 4: repeating steps 1-3 on different surface areas of the substrate.

In another embodiment, the present subject matter relates to a method of confirming the present cleaning methods are more effective than washing with water alone, the confirmation method comprising the further steps of:

step 5: sonicating the substrate with water;

step 6: after the sonicating step, detecting for a negative presence of the adsorbed dye molecules for each of the surface areas of the substrate by using the ultrasensitive optical method;

step 7: after step 6, repeat step 2 for each of the surface areas of the substrate; and step 8: after step 7, detecting for a positive presence of the adsorbed dye molecules for each of the surface areas of the substrate by using the ultrasensitive optical method.

These and other features of the present subject matter will become readily apparent upon further review of the following specification.

DETAILED DESCRIPTION OF THE PREFERRED EMBODIMENTS

Figure 1A:
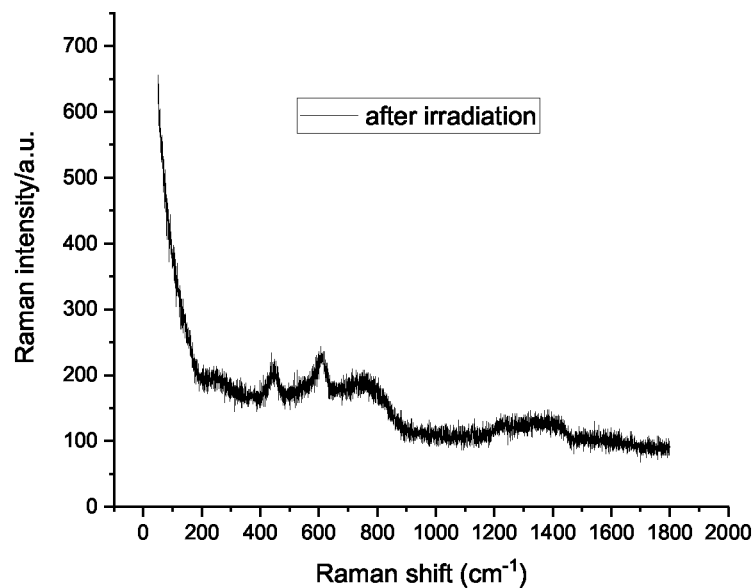
FIGS. 1A-1B show SERS spectra with and without irradiation, respectively, confirming the efficacy of photocatalysts assisted UV laser to clean the surface.
Figure 1B:
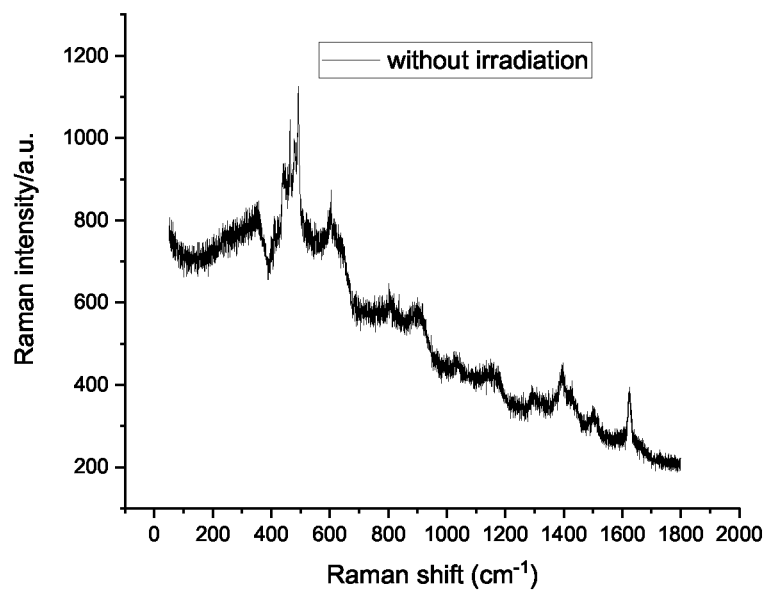

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a method of cleaning adsorbed dye molecules on a metal/metal oxide nanocomposite substrate, the method comprising:
  step 1: detecting for a positive presence of the adsorbed dye molecules on a surface area of the substrate by using an ultrasensitive optical method;
  step 2: irradiating the surface area of the substrate with UV-visible light to clean the adsorbed dye molecules; and
  step 3: detecting for a negative presence of the adsorbed dye molecules on the surface area of the substrate by using the ultrasensitive optical method.

In a further embodiment, the present subject matter relates to a method of cleaning adsorbed dye molecules on a metal/metal oxide nanocomposite substrate, the method further comprising:
  step 4: repeating steps 1-3 on different surface areas of the substrate. In this regard, the repeating of steps 1-3 can be conducted many times.

In an additional embodiment, the present subject matter relates to a method of cleaning adsorbed dye molecules on a metal/metal oxide nanocomposite substrate, wherein step 2, the irradiating step, can be conducted for about 30 minutes. In a further embodiment, the negative presence of the adsorbed dye molecules on the surface area of the substrate is seen by the disappearance of a signal from the ultrasensitive optical method, for example, the disappearance of a SERS signal.

In another embodiment, the present subject matter relates to a method of confirming the present cleaning methods are more effective than washing with water alone, the confirmation method comprising the further steps of:
  step 5: sonicating the substrate with water;
  step 6: after the sonicating step, detecting for a negative presence of the adsorbed dye molecules for each of the surface areas of the substrate by using the ultrasensitive optical method;
  step 7: after step 6, repeat step 2 for each of the surface areas of the substrate; and
  step 8: after step 7, detecting for a positive presence of the adsorbed dye molecules for each of the surface areas of the substrate by using the ultrasensitive optical method.

In one embodiment, the UV-visible light used in the present methods can have a power density of about 100 W/cm$^2$. In certain embodiments, the UV-visible light can be provided by a Mercury lamp. In further embodiments, the Mercury lamp can provide the UV-visible light having a wavelength of about 320 nm to about 800 nm.

In another embodiment, in the confirmation method, the sonicating step can be conducted with water for about 20 minutes. In this regard, the confirmation method can confirm the water is unable to clean the adsorbed molecules from the substrate without using the UV-visible light.

In certain embodiments, the dye molecules adsorbed on the substrate can be of a dye selected from the group consisting of Methylene Blue, Rhodamine B, Congo Red, Phenol Red, Metanil Yellow, Malachite Green, and combinations thereof. In an embodiment, the dye molecules adsorbed on the substrate can be Methylene Blue.

In additional embodiments, the ultrasensitive optical method can be selected from the group consisting of surface plasmon resonance microscopy (SPRM), scanning electron microscopy (SEM), UV-Vis spectroscopy, photothermal optical microscopy, dynamic light scattering, dark filed optical microscopy, Raman spectroscopy, surface-enhanced Raman spectroscopy (SERS), and scanning probe microscopy. In one specific embodiment in this regard, the ultrasensitive optical method can be surface-enhanced Raman spectroscopy (SERS).

In a further embodiment, the metal/metal oxide nanocomposite substrate can be selected from the group consisting of $TiO_2$, $Fe_2O_3$, and a combination thereof. In an embodiment, the nanocomposite substrate can be $TiO_2$ doped with metallic ions. Further, the substrate can be a paint or a solid state film.

In certain embodiments, the adsorbed dye molecules on the metal/metal oxide nanocomposite substrate can be in a drying state.

The present subject matter can be better understood by referring to the following examples.

EXAMPLES

Example 1

Dye molecules were wisely dropped onto the surface of a metal/metal oxide nanocomposite. The presence of the adsorbed molecules was confirmed using an ultrasensitive optical method. In order to clean the adsorbed molecules, the sample was irradiated with UV-visible light with a power density of 100 W/cm$^2$. After that, the same area was tested again with the aforementioned optical method. It was discovered that no signal was observed. Different points of the substrate were checked to assure the reproducibility of the method.

On the same irradiated substrate, another area was dropped with the dye molecules in order to confirm again the presence of the dye molecules. In order to prove the originality of the method, the same sample was sonicated with water for 20 minutes. The areas were tested again and the results confirmed the presence of dye molecules dropped after irradiation; however, the area dropped before irradiation showed no signal.

It is to be understood that the present methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of degrading adsorbed dye molecules on a metal/metal oxide nanocomposite substrate, the method comprising:
   step 1: detecting a presence of the adsorbed dye molecules on a surface area of the substrate by using an ultrasensitive optical method; and
   step 2: irradiating the surface area of the substrate with UV-visible light to degrade the adsorbed dye molecules;
   step 3: confirming an absence of the adsorbed dye molecules on the surface area of the substrate by using an ultrasensitive optical method;
   step 4: repeating steps 1-3 on different surface areas of the substrate;
   step 5: sonicating the substrate;
   step 6: after the sonicating step, confirming an absence of the adsorbed dye molecules for each of the surface areas of the substrate by using the ultrasensitive optical method;
   step 7: after step 6, repeat step 2 for each of the surface areas of the substrate; and
   step 8: after step 7, confirm an absence of the adsorbed dye molecules for each of the surface areas of the substrate by using the ultrasensitive optical method.

2. The method of degrading adsorbed dye molecules on a metal/metal oxide nanocomposite substrate of claim 1, wherein step 2 lasts for about 30 minutes.

3. The method of degrading adsorbed dye molecules on a metal/metal oxide nanocomposite substrate of claim 1, wherein the UV-visible light has a power density of about 100 W/cm$^2$.

4. The method of degrading adsorbed dye molecules on a metal/metal oxide nanocomposite substrate of claim 1, wherein the UV-visible light is provided by a Mercury lamp.

5. The method of degrading adsorbed dye molecules on a metal/metal oxide nanocomposite substrate of claim 4, wherein the Mercury lamp provides the UV-visible light having a wavelength of about 320 nm to about 800 nm.

6. The method of degrading adsorbed dye molecules on a metal/metal oxide nanocomposite substrate of claim 1, wherein the sonicating step is conducted with water for about 20 minutes.

7. The method of degrading adsorbed dye molecules on a metal/metal oxide nanocomposite substrate of claim 1, wherein the dye molecules are of a dye selected from the group consisting of Methylene Blue, Rhodamine B, Congo Red, Phenol Red, Metanil Yellow, Malachite Green, and combinations thereof.

8. The method of degrading adsorbed dye molecules on a metal/metal oxide nanocomposite substrate of claim 7, wherein the dye molecules are of Methylene Blue.

9. The method of degrading adsorbed dye molecules on a metal/metal oxide nanocomposite substrate of claim 1, wherein the ultrasensitive optical method is selected from the group consisting of surface plasmon resonance microscopy (SPRM), scanning electron microscopy (SEM), UV-Vis spectroscopy, photothermal optical microscopy, dynamic light scattering, dark filed optical microscopy, Raman spectroscopy, surface-enhanced Raman spectroscopy (SERS), and scanning probe microscopy.

10. The method of degrading adsorbed dye molecules on a metal/metal oxide nanocomposite substrate of claim 9, wherein the ultrasensitive optical method is surface-enhanced Raman spectroscopy (SERS).

11. The method of degrading adsorbed dye molecules on a metal/metal oxide nanocomposite substrate of claim 1, wherein the metal/metal oxide nanocomposite substrate is selected from the group consisting of $TiO_2$, $Fe_2O_3$, and a combination thereof.

12. The method of degrading adsorbed dye molecules on a metal/metal oxide nanocomposite substrate of claim 1, wherein the adsorbed dye molecules on the metal/metal oxide nanocomposite substrate are in a drying state.

13. The method of degrading adsorbed dye molecules on a metal/metal oxide nanocomposite substrate of claim 1, wherein the substrate is a paint or a solid state film.

* * * * *